United States Patent Office 3,290,235
Patented Dec. 6, 1966

3,290,235
ELECTRODEPOSITION OF ACIDIC RESIN WITH SUBSEQUENT ANODIC ELECTROLYSIS IN DISPERSION CONTAINING METAL TREATING OXYANIONS
Allan E. Gilchrist, Westlake, Ohio, assignor to The Glidden Company, Cleveland, Ohio, a corporation of Ohio
No Drawing. Filed Dec. 2, 1965, Ser. No. 511,222
9 Claims. (Cl. 204—181)

The instant invention relates to an improved metal coating process, and more particularly to a process having a unique and effective sequence of anodic application of an organic film to metal followed by anodic treatment of the base metal with an oxyanion such as chromate or phosphate through the initially-deposited film.

The electrodeposition of acidic organic resinous materials to an anode substrate under the influence of direct current to form a paint film is now well-established practice. Typical disclosures of this practice are in my copending U.S. Patent applications Serial Numbers 304,297 (now U.S. Patent 3,230,162 of January 18, 1966), 467,390, 375,663; French Patent 1,375,531; U.S. Patents 2,241,876 and 3,200,057; Belgian Patent 633,074; and South African Patents 641,587, 632,391, and 635,534. The disclosures of these documents are incorporated herein by reference.

It is customary to phosphate-treat and chromate-treat metal substrates, particularly steel substrates, preparatory to painting. Generally the so-treated metal is dried before painting to provide a base that is resistant to corrosion and has a good "tooth" for the subsequent paint film. The metal treating usually is done with aqueous acidic solution of the inorganic oxyanion or oxyanions dipped or sprayed on the metal part. Such metal treating solution can contain a water soluble or dispersible polyacrylic acid compound as shown in U.S. Patent 3,185,596 or 3,132,055. Alternatively, in some cases, the treated part can be amine-rinsed as shown in U.S. Patent 3,154,438 to prepare it for subsequent conventional paint application with a water soluble paint without intermediate drying. The metal also can be anodically treated with an aqueous acidic solution of phosphoric acid such as is shown in U.S. Patent 2,868,705.

A related metal treatment involving metal treating oxyanions in relatively high concentration and organic polymer together is shown in U.S. Patent 3,175,946. Here it is shown that a cleaned steel sheet can be subjected to anodic electrolysis in an aqueous dispersion containing acidic organic polymer and certain organic oxyanions for a very short period. Then the polarity of the metal is reversed to make it a cathode for a short period, and finally the thus-coated electrode is dried.

The instant invention has numerous advantages over the customary non-electrical or electrolytic treatments with oxyanion followed by drying and electrodeposition of a paint film because there is no separate drying step needed for the oxyanion-treated metal. It has the general advantage over all the foregoing proposals because the thickness of deposition of the acidic organic film can be regulated within a broad useful range, and it can be made thick enough to sand, if desired; it also provides a highly efficient cleansing action on a metal surface and promotes chemical reactivity thereof for the subsequent metal treating oxyanionic solute deposition. The generally low specific resistance of the aqueous electrolytic composition in the second stage of my treatment relative to that of the first stage provides for extension of corrosion-resisting deposits into remote areas of the anode being coated (which areas can be poorly coated or not coated at all by the paint in the first stage) and can be coupled with simultaneous deposition of additional anodically-depositable organic coating material for further protection. No reversal of polarity is necessary. As it is generally economical to dry (or cure) the resinous films under forced conditions (elevated temperature), the drying of those films and the metal treating oxyanion deposition can be done simultaneously in one piece of equipment with concomitant saving in floor space, equipment, utilities, and time.

Broadly, the instant process is an improvement in painting metal wherein a paint composition containing acidic resin is deposited onto a metal object of anodic polarity under the influence of direct current to form a coated object. The improvement comprises subjecting the coated object to a subsequent and separate stage of direct current anodic electrolysis in contact with an aqueous dispersion containing at least metal treating oxyanion solute before curing the coated object to an ostensibly dry and tack-free state.

The anodic deposition of paint in the first step is meant to include such deposition of finely ground pigment and/or filler with a resinous binder, the deposition of binder without pigment and/or filler, or having very little of same, but which can be tinted if desired, and generally, therefore, the deposition of water-reducible surface coating compositions containing acidic resinous binder, which compositions can be considered to be analogous to enamel, varnish, lacquer, and paint bases. Preferably any pigment or filler used is substantially inert to the other components in the first stage and second stage electrolyte dispersion.

For efficiency and economy the best resinous binders used in the first step are those convertible from a fluent, highly stable, water-dispersed state into a pronouncedly water-resistant film by the anodic electrodeposition. The resin can be all or virtually all that is to be deposited to form the film, or it can be a vehicle for pigmentary and/or mineral filler material, or even for dispersed nonionic resin extenders on which it exerts the desired even film deposition action. It can be reduced in some instances with compatible organic solvents such as nonionic liquids which are fugitive on curing the resulting film.

Advantageous resins for my purpose are the at least partially neutralized (with basic amine compound or ammonia), dispersed polycarboxylic acid resins exhibiting anionic solute behavior with respect to migration to the anode in the electrical field used, the preferred ones being those shown in my copending patent application S.N. 304,297, now U.S. Patent 3,230,162. Those particularly preferred, because of their availability and economy, are those having polycarboxylic acid functionally derived from maleic anhydride, acrylic acid, or methacrylic acid in their structures.

The oxyanion solute for metal treating in the second stage can be one or a mixture, and aqueous solution thereof should be unaffected by or even assisted by the use of a nitrogenous base such as an amino compound or ammonia. The broadly useful inorganic oxyanions for metal treating react with iron and/or aluminum surfaces to yield water-resistant, adherent, non-volatile deposits when dried with heat. For their efficacy in rustproofing the art-preferred oxyanion solutes in aqueous solution are phosphates and/or chromates, these often are mixed with dichromates, borates, oxalates, molybdates, tungstates, vanadates, and fluosilicates. I can employ them for a similar purpose and therefore prefer them. Also suitable for my deposition purposes are water soluble oxyanions such as titanates, manganates, columbates, zirconates, hafnates, silicates, zincates, plumbates, cadmates, aluminates, arsenates, antimonates, bismuthates, stannates, arseno-molybdates, phospho-vanadates, phospho-molybdates, phospho-tungstates, and the like, and mixtures of the same. Generally, then, the metal treating oxyanion solute can be typified as an oxyanion of an amphoteric metal, phosphorus, boron, arsenic, silicon, and the oxalate anion, and by the term "metal treating oxyanion solute" I mean to comprehend members of this group individually and as mixtures.

The concentration of such metal treating oxyanion solute or mixed solutes need not be high, suitably 1/10–2% by weight being quite effective. To reduce or prevent mottling of the cured resinous film I have found that concentration of the oxyanion in solution best is kept below about 1–1/2% by weight, advantageously below about 1%, and preferably between about 1/10 and 1/2.

pH of the metal treating oxyanion solution for second stage anodic electrolysis must be sufficient to keep such anions soluble for effective deposition, and generally can be in the range from about 1–10, and preferably between about 5 and 9. Where the second stage electrolysis medium contains also dispersed resinous material for codeposition, the dispersion pH should, of course, be high enough to keep such resinous material adequately and stably suspended, in such instance the minimum pH being from about 5 to 8.5, depending on the ionization requirements of the co-depositable resin. In this connection I have found it generally advantageous to use second stage solutions of the oxyanion containing basic amino compound and/or ammonium ions to regulate pH and to maintain dispersibility of resin and solubility of the inorganic oxyanion. Typical useful nitrogenous bases are ammonia and basic amino compounds including hydroxylamines, polyamines, and monoamines such as monoethanolamine, diethanolamine, diisopropanolamine, diethylene triamine, ethylenediamine, triethylamine, and the like. Generally I prepare the oxyanion solution to have a slight amine or ammonia equivalent excess over that stoichiometric for obtaining what could be described most simply as an "acid salt" of the inorganic oxyanion or mixed oxyanions.

Use of resinous material for codeposition in the second electrolytic stage, suitably but not necessarily of the same kind as used in the primary paint deposition, has the special advantage of being applied to a metal surface that is already partially electrically insulated by virtue of the first deposition, and in an aqueous dispersion that has generally much lower specific electrical resistivity than the first deposition so that remote inadequately coated or uncoated areas can be reached and given protective resinous deposit as well as the oxyanion treatment.

Ordinarily the first stage anodic treatment to deposit the paint and the second stage anodic treatment to secure the inorganic oxyanion conditioning of the metal will be done in successive aqueous baths. However, one or both stages can be done by spraying the particular aqueous dispersion onto the anodic part, provided that the spray makes a continuous stream that carries the necessary direct electric current. Dipping of the anode into an electrolytic bath is preferred for reaching remote surfaces in each stage. In the first stage, using the preferred painting baths, the voltage ordinarily is at least about 50 and preferably 100 to 300, and can even be higher, providing it does not destabilize the paint dispersion or "burn" spots in the deposited film, e.g., 500 volts or more. Lower voltages can be used, of course, to deposit the first stage resinous film, but are generally less efficient. The first deposition preferably is done to get films thick enough to sand, e.g., one-half mil or more. Typical deposition times for the first electrolytic stage are from about 30 seconds to about 3 minutes. The specific electrical resistivity of the deposited first stage resinous film before curing can be as high as 70 megohms per centimeter or even greater.

The best resinous first films which are anodically deposited are tacky before curing, but have sufficient water resistance to permit washing with a stream of water to remove drips, surface bubbles, and the like. Curiously, even such seemingly durable and electrically-resistant films, however, appear to be penetrated by the oxyanions, which go directly to the surface of the metal under the influence of the second stage anodic electrolysis. This can be shown by using in my process a first stage bath depositing one color of coating and a second stage bath depositing a different color of coating, and noticing in the cross section that the second color deposits most richly next to the metal.

Second stage depositions can be effective at voltages as low as about 10, but for efficiency higher voltages generally are used, e.g., 15–50. Where electrical apparatus will permit even higher voltages, e.g., 100–170, they can be useful for obtaining extra deposition of resin in that stage. Typically, the second stage electrolytic deposition can be done in about 10 to 60 seconds, although longer deposition times can also be useful, particularly when co-depositable resinous material is used in that stage.

Curing of the resulting composite film preferably is forced with heat in an oven or stove to temperatures up to about 500° F., thus shortening the times for achieving ostensible drying and easy handling properties of the metal object. Typical curing cycles are 300–500° F. for 5 to 20 minutes. Alternatively, however, air curing at about room temperature can be used where longer times are permissible and the resinous coating is capable of thus achieving ostensible dryness for handling and service. Alternatively, also, curing can be done in some instances by ionizing radiation or by the application of an insolubilizing surface treatment, that is treatment with a material which will cross link with or otherwise set the resin deposit, e.g., polyepoxy compounds, polymerizable ethylenically unsaturated materials such as divinyl benzene, alum solution, Group IIB–VIII metal salt solutions reactive with carboxylic acid groups, etc. Slight air drying to the anode part between stages can be tolerated, but in general the film must be tacky and quite incompletely cured to be receptive to the second stage treatment.

To maintain constancy of composition and to avoid the build-up of amine in the first bath acidic resinous concentrate preferentially is added to the bath to replenish it in accordance with my U.S. patent application Ser. No. 304,297, and even more particularly Ser. No. 375,633, where pigmentation of the resin is involved. Similarly, the second bath can be made up with additions of inorganic oxyacid-rich compositions such as aqueous solutions rich in phosphoric acid and chromic acid or anhydrides or acid salts thereof.

Suitably the metal before painting is cleansed to rid it of mill oils, scale, and the like. Typical cleansing treatments include the use of organic solvents such as trichloroethylene, caustic washing with aqueous caustic soda or the like, electrolytic caustic treatment, and desirably, finally washing with deionized water to remove stray electrolytes. Typical metals particularly amenable to my treatment are cold rolled steel, mild steel, galvanized iron or steel, and extra low carbon steel.

The following examples show ways in which my invention can be practiced, but are not to be construed as limiting the invention. Unless otherwise specified, all parts are parts by weight, all percentages are weight percentages, and all temperatures are degrees Fahrenheit.

*Example 1*

An extended coupled glyceride drying oil paint binder is made by reacting in an agitator tank 5852 parts of alkali-refined linseed oil and 1373 parts of maleic anhydride at 425° for about 3 hours until an acid value of 75–85 results, then cooling this intermediate to 315°, adding 1233 parts of vinyl toluene and 42 parts of ditertiary butyl peroxide, and reacting at 425° for one hour. The resulting vinyl toluenated material is then cooled to 315° and 1500 parts of non-heat-reactive, thermoplastic, oil-soluble phenolic resin are added, the temperature raised to 350°, and the mixture held one hour. The phenolic resin is a solid lump resin having softening point of 120–140° C., specific gravity of 1.03–1.05 at 20° C., and has been stripped to get out excess phenol and low molecular weight materials. It is a condensation product of about equimolar quantities of para tertiary butyl phenol and formaldehyde.

1140 parts of this resin are mixed at 160° with 100 parts of water and 13.6 parts of triethylamine for one-half hour. 250 parts of the resulting mixture are then mixed with 50 parts of aqueous amine mixture at 150° for 15 minutes. The amine mixture consists of diisopropanolamine, diethylene triamine, and water in the respective weight proportions of 375/109/375. A first aliquot of this paint dispersion is then further let down with water to 5% resin solids (N.V.M.) concentration having pH of 7.35 at 80° and specific electrical resistivity of 1057 ohm-centimeters.

Diisopropanolamine and phosphoric acid are blended together in the presence of water in respective proportions sufficient to yield an aqueous 25% solution of diisopropanolamine dihydrogen phosphate with 10% excess of the amine over the stoichiometric for such salt. Diisopropanolamine and chromic trioxide are blended together in the presence of water in proportion sufficient to yield an aqueous 5% solution of diisopropanolamine hydrogen chromate with a 25% excess of the amine over the stoichiometric for such salt.

A second aliquot of the above-described paint dispersion is let down with these phosphate and chromate solutions and additional water to yield a dispersion of 2% resin solids (N.V.M.) containing 1% equivalent diisopropanolamine dihydrogen phosphate and ⅕% equivalent diisopropanolamine hydrogen chromate. pH of the phosphate-chromate solution containing dispersed resin is 6.1 at 80° F., and it has specific electrical resistivity of 376 ohm-centimeters.

Two electrolytic baths are set up at 80° F., the first bath being made with the first aliquot of amine-dispersed resin, and the second bath with the phosphate-chromate solution containing dispersed resin. To best study the effects of the process no pigments are used. The metal bath tanks are wired as direct current cathodes for the anodic workpiece. A 24 gauge, cleaned, cold rolled steel panel 4″ x 4″ is anodically charged to 100 volts and dipped automatically into a metal container containing the first bath at the rate of 12″ per minute to a depth of 3⅜″. The power is kept on for 60 seconds, then turned off. The panel is removed promptly from the bath, leaving its top ⅝″ uncoated, and the bottom 3⅜″ faces and edges coated with about a half mil of uncured resin. Specific electrical resistivity of this deposited film is about 70 megohms per centimeter.

Then the wet panel is charged to 25 volts and automatically dipped into the second bath in like manner to a depth of 2½″ of the previously-coated surface. Voltage drops to about 15 and recovers. The power is kept on for 30 seconds, then turned off. The panel is then removed, rinsed with water, and cured for 20 minutes in an atmospheric oven at 250° to yield a tack-free panel having about a half mil paint coating on the intermediate 1⅛″ area and about a 0.6 mil paint coating on the lower 2½″ area.

The panel is then scribed to base metal vertically across one face. After 18 hours' exposure to a standard salt spray test the uncoated ⅝″ top area is entirely corroded. The intermediate ⅛″ area shows some blistering and loss of adhesion to the metal surface on each side of the scribe mark. The 2½″ composite coated area shows no corrosion nor loss of adhesion along the scribe cut.

*Example 2*

This operation is conducted like that of Example 1, except that in the second stage bath the resinous material used is the room temperature reaction product of 1 mol of diethylene triamine and 2 mols of dimer fatty acid (predominantly the dimer of $C_{18}$ mono-unsaturated fatty acids, principally linoleic, with some trimer). The concentration of this supplementary organic coating material is 10% in the aqueous second stage bath, and to maintain its fluidity in the bath and equal weight of 2-butoxyethanol-1 solvent is used. The resulting composite coating is force cured as in Example 1 to give a durable tack-free film.

*Example 3*

This operation is conducted like that of Example 1, except that in the second stage bath the resinous material is in concentration of 10% and the total concentration of the amine salts is ¼%, one-sixth of which is from the chromate and five-sixths of which is from the phosphate. The resulting composite coating is force cured as in Example 1 to give a durable tack-free film of improved appearance because of practically complete freedom from any mottling.

*Example 4*

This operation is conducted like that of Example 3, except that in the second stage bath only the amine phosphate is used, and this at a concentration of ¼%. The coated panel cures to yield a durable film of good appearance. As successive panels are thus coated the second stage bath can be replenished with aqueous phosphoric acid to maintain the desired concentration.

I claim:
1. In a process for painting metal wherein a paint composition containing acidic resin is deposited from aqueous dispersion in the absence of a substantial amount of metal treating oxyanion solute onto a metal object of anodic polarity under the influence of direct electric current to form an object at least partially coated with curable resinous film, the improvement which comprises subjecting said coated object to a separate stage of direct current anodic electrolysis in contact with an aqueous dispersion containing at least one metal treating oxyanion solute before curing said film, said metal treating oxyanion solute being selected from the group consisting of an oxyanion of phosphorus, boron, arsenic, silicon, an amphoteric metal, the oxalate anion, and mixtures of same.

2. The process of claim 1 wherein said oxyanion solute comprises phosphate.

3. The process of claim 1 wherein said oxyanion solute comprises chromate.

4. The process of claim 1 wherein the total concentration of said oxyanion solutes in said separate stage is not substantially in excess of about 2% by weight.

5. The process of claim 1 wherein said aqueous dispersion for said subsequent electrolysis contains dispersed anodically-depositable organic coating material.

6. The combination process for electropainting and treating a metal surface which comprises the steps of:
 (a) establishing said metal surface as a direct current anode;
 (b) depositing on said anode with direct current a coating composition containing acidic resin from an aqueous dispersion containing no substantial quantity of metal treating oxyanion solute;
 (c) subsequently subjecting said coated object in its uncured state as an anode to subsequent direct current electrolysis in contact with an aqueous dispersion containing at least one metal treating oxyanion solute, said metal treating oxyanion solute being selected from the group consisting of an oxyanion of phosphorus, boron, arsenic, silicon, an amphoteric metal, the oxalate anion, and mixtures of same;
 (d) then force-curing the resulting composite coating.

7. The process of claim 6 wherein said oxyanion solute comprises phosphate.

8. The process of claim 6 wherein said oxyanion solute comprises chromate.

9. The process of claim 6 wherein steps (b) and (c) are performed in successive electrolytic baths.

References Cited by the Examiner

UNITED STATES PATENTS

| | | | |
|---|---|---|---|
| 2,868,705 | 1/1959 | Baier et al. | 204—140.5 |
| 3,097,978 | 7/1963 | Newell et al. | 148—6.14 |
| 3,132,055 | 5/1964 | Tanaka et al. | 148—6.16 |
| 3,133,838 | 5/1964 | Higgins | 148—6.15 |
| 3,154,438 | 10/1964 | Keller et al. | 148—6.15 |
| 3,175,964 | 3/1965 | Watanabe et al. | 204—37 |
| 3,185,596 | 5/1965 | Schiffman | 148—6.16 |
| 3,210,219 | 10/1965 | Jenkins | 148—6.15 |

FOREIGN PATENTS 635,534  12/1963  Republic of South Africa.

JOHN H. MACK, *Primary Examiner.*

E. ZAGARELLA, *Assistant Examiner.*